(12) United States Patent
Panteleev et al.

(10) Patent No.: US 10,880,897 B2
(45) Date of Patent: Dec. 29, 2020

(54) APPARATUS OF A USER EQUIPMENT (UE) TO SELECT RESOURCES IN A VEHICLE TO VEHICLE (V2V) COMMUNICATION SYSTEM

(71) Applicant: Apple Inc., Cupertino, CA (US)

(72) Inventors: Sergey Panteleev, Nizhny Novgorod (RU); Alexey Khoryaev, Nizhny Novgorod (RU); Sergey D. Sosnin, Zavolzhie (RU); Andrey Chervyakov, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/094,853

(22) PCT Filed: May 15, 2017

(86) PCT No.: PCT/US2017/032679
§ 371 (c)(1),
(2) Date: Oct. 18, 2018

(87) PCT Pub. No.: WO2017/197393
PCT Pub. Date: Nov. 16, 2017

(65) Prior Publication Data
US 2019/0150157 A1   May 16, 2019

Related U.S. Application Data

(60) Provisional application No. 62/336,404, filed on May 13, 2016.

(51) Int. Cl.
*H04W 72/04*   (2009.01)
*H04W 4/46*   (2018.01)
(Continued)

(52) U.S. Cl.
CPC ......... *H04W 72/0486* (2013.01); *H04W 4/46* (2018.02); *H04W 72/082* (2013.01); *H04W 76/14* (2018.02)

(58) Field of Classification Search
None
See application file for complete search history.

(56) References Cited

U.S. PATENT DOCUMENTS

2004/0090916 A1 * 5/2004 Hosein .................... H04L 47/10
  370/235
2005/0107091 A1 * 5/2005 Vannithannby ....... H04W 28/08
  455/453
(Continued)

FOREIGN PATENT DOCUMENTS

WO   WO 2015/160197 A1   10/2015

OTHER PUBLICATIONS

3GPP.; "On Sensing Design Details for Sidelink V2V Communication." R1-162363; vol. Ran WG1, no. Busan, Korea; Apr. 2, 2016; Retrieved from: http://www.3gpp.org/ftp/tsg_ran/wg1_RL1/TSGR1_84b/Docs/ on Apr. 4, 2016; 10 Pages.
(Continued)

*Primary Examiner* — Bunjob Jaroenchonwanit

(57) ABSTRACT

Technology for an apparatus of a user equipment (UE) configured to select spectrum resources in a vehicle to vehicle (V2V) communication system is disclosed. It relies on the established mechanisms for device-todevice, D2D direct mode communication well-known in the context of Proximity Services in a 3GPP LTE communications system. The UE can calculate a received energy in a physical sidelink shared channel (PSSCH) over a sensing period for a portion of one or more sub-channels over selected subframes in a resource pool, by means of measurements of Received Signal Strength Indication, RSSI, of other D2D sidelink channel communications. The UE can identify the
(Continued)

one or more sub-channels over the selected subframes that has a measured energy level greater than a threshold value to determine a channel congestion fraction (CCF) comprising a fraction of the resources that exceed the threshold value, reflecting a resource utilization. The UE can send the channel congestion fraction (CCF) to an upper layer of the UE to enable resource reselection for the UE based on the fraction of the resources that exceed the threshold value. The configuration of D2D retransmission parameters is in particular addressed, according to the measured congestion or interference. The UE may as well transmit the measured CCF to a base station evolved node B, eNB, which may accordingly reconfigure the UE's sidelink channel communication transmission parameters.

17 Claims, 9 Drawing Sheets

(51) Int. Cl.
*H04W 76/14* (2018.01)
*H04W 72/08* (2009.01)

(56) References Cited

U.S. PATENT DOCUMENTS

| | | | |
|---|---|---|---|
| 2008/0304447 A1* | 12/2008 | Kim | H04L 1/1812 370/329 |
| 2011/0134876 A1* | 6/2011 | Takada | H04W 72/0406 370/329 |
| 2014/0113631 A1* | 4/2014 | Zhou | H04L 45/028 455/436 |
| 2015/0029926 A1* | 1/2015 | Ryu | H04B 7/026 370/312 |
| 2015/0215903 A1* | 7/2015 | Zhao | H04W 72/02 370/329 |
| 2015/0319765 A1* | 11/2015 | Zhu | H04W 28/16 370/329 |
| 2016/0014834 A1* | 1/2016 | Chang | H04W 76/14 370/329 |
| 2016/0057693 A1* | 2/2016 | Nagata | H04W 8/005 370/254 |
| 2016/0088643 A1* | 3/2016 | Guo | H04W 72/085 370/329 |
| 2016/0095074 A1* | 3/2016 | Park | H04W 8/005 370/350 |
| 2016/0381672 A1* | 12/2016 | Kim | H04W 72/048 370/329 |
| 2017/0041971 A1 | 2/2017 | Kim et al. | |
| 2017/0070876 A1* | 3/2017 | Fujishiro | H04W 76/14 |
| 2017/0171884 A1* | 6/2017 | Niu | H04W 74/006 |
| 2017/0171897 A1* | 6/2017 | Ryu | H04L 5/006 |
| 2017/0230918 A1* | 8/2017 | Ryu | H04W 52/383 |
| 2018/0077748 A1* | 3/2018 | Kazmi | H04W 76/14 |
| 2018/0091263 A1* | 3/2018 | Li | H04L 1/1816 |
| 2018/0343632 A1* | 11/2018 | Lee | H04J 11/00 |
| 2019/0028978 A1* | 1/2019 | Yasukawa | H04W 4/70 |
| 2019/0044659 A1* | 2/2019 | Aln S | H04W 74/004 |
| 2019/0174349 A1* | 6/2019 | Sun | H04W 28/0205 |
| 2019/0222980 A1* | 7/2019 | Lee | H04W 4/40 |
| 2019/0239112 A1* | 8/2019 | Rao | H04W 28/0268 |
| 2019/0261442 A1* | 8/2019 | Yoon | H04W 8/005 |
| 2019/0289485 A1* | 9/2019 | Lee | H04W 72/04 |
| 2019/0373502 A1* | 12/2019 | Chae | H04W 24/08 |
| 2019/0373637 A1* | 12/2019 | Lee | H04W 4/40 |

OTHER PUBLICATIONS

PCT Application No. PCT/US2017/032679, Filing Date May 15, 2017, Sergey Panteleev; International Search Report; dated Jul. 31, 2017; 15 Pages.

* cited by examiner

… …

APPARATUS OF A USER EQUIPMENT (UE) TO SELECT RESOURCES IN A VEHICLE TO VEHICLE (V2V) COMMUNICATION SYSTEM

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, eNBs, next generation Node Bs, or gNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Device-to-device communications in cellular telephone services can provide direct communication between nearby mobile devices. The direct communications between proximate devices can improve spectrum utilization, improve overall throughput and performance, improve energy consumption, and enable peer-to-peer and location-based applications and services.

In such proximity services, vehicle-to-vehicle communications is a fast and emerging field in wireless communication. Cars, busses, trucks and other vehicles can communicate directly between mobile devices in vehicles to support various applications ranging from road safety to autonomous driving. Such applications and services will need highly reliable packet delivery within predefined target communication ranges for the vehicles' transmitters, all while subject to low packet transmission latency demands. In addition, vehicle-to-vehicle services may also need to provide communications with vehicles outside the network coverage. Accordingly, there is a continuing need for improved proximity services for vehicle-to-vehicle communications that can provide for a range of performance characteristics.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
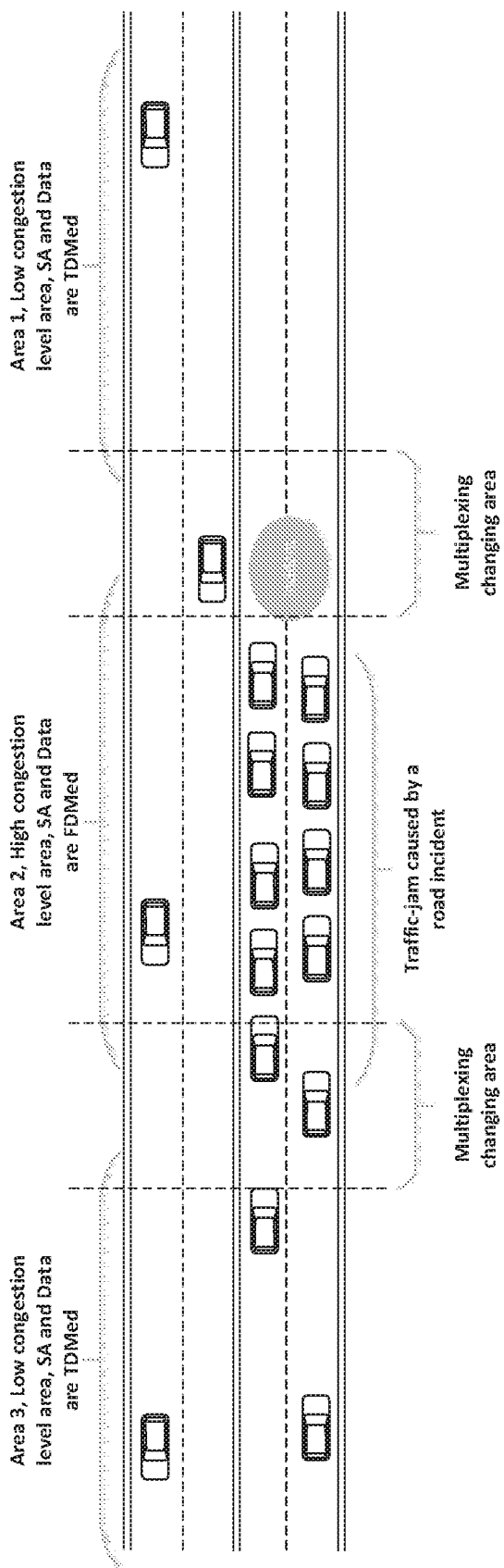
FIG. 1 depicts functionality of a vehicle to vehicle communication system comprising of zones with different SA/Data transmission multiplexing, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Vehicle to Vehicle (V2V) communication is a technology that provides the sensing based resource selection with semi-persistent transmission for PC5 based operation. PC5 is a device to device interface between two mobile devices. The mobile devices are typically enabled to provide proximity based services (ProSe). In V2V communication systems, the UE can select a resource size based on its implementation. In addition, the resource size and transmission rate may affect the overall system performance because of direct impact on resource utilization, congestion and interference. The V2V communication embodiments as proposed can include mechanisms of determining resource allocation size and transmission rate based on semi-autonomous selection rules with or without eNB assistance.

In one example, there can be an introduction of additional metrics characterizing resource utilization and congestion level that may be signaled to eNB and/or used by a UE to restrict the transmission parameters, such as resource allocation size, MCS, number of retransmissions, control and data multiplexing mode in order to optimize the system performance in terms of packet reception ratio and reliability.

In one example, the transmission parameters selection may be based solely on UE implementation. If different UEs have different behavior for selection of transmission parameters then the system may not work properly since the sensing procedure may assume similar UE behavior. This embodiment can minimize the difference in UE behavior, thus optimizing the system performance while still having flexibility in terms of transmission parameters change to adapt to traffic conditions.

In one example, it can be assumed that each UE performs resource selection and reselection procedures after a reselection condition is met or triggered. In one example, the resource reselection may be triggered if traffic parameters have changed, the radio environment has changed, or prioritized traffic appears. When the radio environment has changed, a collision can be detected and resource utilization and congestion can change. Some embodiments focus on aspects of taking into account the traffic parameters and radio environment to calculate the resource allocation size and transmission rate.

Resource Reselection Based on Resource Utilization Condition

The resource utilization (RU) metric itself may be calculated in different ways. In one embodiment there can be a Fraction of Physical Sidelink (SL) Shared Channel (PSSCH) resource blocks in the sensing window with measured/calculated energy above a configured or predefined threshold. This fraction of resources, such as resource blocks (RBs) or sub-channels, with a measured and/or calculated energy level that is above a predefined threshold, can be referred to as a channel congestion fraction (CCF). In this case, a UE may evaluate whether the measured/estimated energy on each RB is above a threshold or a set of thresholds, i.e. ER>ti, where ER—estimated energy on a resource, ti—evaluated energy threshold. For each configured threshold in the set, the UE may calculate the overall number of RBs with energy above this threshold. Then from this value and the overall number of RBs in the sensing window, the UE can calculate the fraction of resources experiencing the interference above the threshold, where i is the index of the configured threshold ti in the set. Note, that if granularity of resource allocation with more than one PRB is introduced, then the fraction of resources may be calculated over the minimum resource granularity, i.e. over sub-channels. Additionally, if a UE may detect several UEs use the same resources, it may count them separately in the resource utilization so that in an overload case>100% indication is possible.

In one embodiment, the set of thresholds can be signaled in RRC signaling (broadcast and/or dedicated) or may be preconfigured. The signaling of thresholds through RRC may be a more appropriate way since different typical values may be needed for different network deployments. The set of thresholds may be signaled as a vector of integer or enumerated type values. The maximum number of thresholds should be fixed in specification, e.g. to 4 or 8.

In another embodiment, a fraction of PSSCH resource blocks can be reserved by other UEs, which transmitted Sidelink Control Information (SCI). In this case, there is no threshold applied explicitly. The implicit threshold of decoding the PSCCH is used. This metric may be accompanied by an energy measurement over the whole sensing window, e.g. Received Signal Strength Indication (RSSI). If multiple resource pools (or transmission intervals) are configured, then the resource utilization metric should be calculated per resource pool.

In one example, triggering of resource reselection based on the observed short-term resource utilization is not justified since eventually it may not help to solve the problem especially if utilization is high. On the other hand, it may be beneficial to control the transmission rate (transmission period) or resource allocation parameters that can be used by UEs in semi-persistent resource allocation window. Therefore, there are two potential considerations in terms of resource reselection triggering. In the first option, the UE can report a resource utilization metric (i.e. a metric such as the channel busy ratio (CBR)) to upper layers (e.g. layer 3 (L3) or above) that either control traffic parameters or resource allocation parameters, so that it is transparent to L1/L2 operation and the resource reselection is triggered as a part of a higher layer condition. In the second option, the UE can trigger resource reselection to adjust resource allocation size or transmission parameters based on a resource utilization metric such as a L1/L2 condition. Regardless of the applied procedure (option 1 or option 2), the resource utilization metric can be taken into account for selection of resource size and transmission rate (transmission periodicity). The means for taking the resource utilization and other metrics/parameters into account for resource allocation are discussed in the following sections.

Resource Allocation Size Limitation

In UE autonomous resource selection mode, the UE may not have limitations in terms of an amount of resources it may allocate for transmission. From a system perspective, it may be a good rule of thumb to allocate the minimum number of resources to provide service. However, in a multi-user environment, the UE resource selection behavior, in terms of resource allocation size, can be dependent on at least several factors. These factors can comprise one or more of an amount of traffic wherein each packet may have different size ranging from approximately 100 bytes to approximately 1200 bytes, radio-environment conditions wherein there is a level of congestion or interference, a service level to be provided, and a fairness.

In order to address the limitations of the UE, there are several approaches that can be utilized. In one embodiment the parameters can be left to a setting for UE implementation. In this case, different UEs may have different behavior for setting the resource allocation size, number of retransmissions, transmission rate (periodicity) etc. that may degrade overall system performance. However, it is noted, that the sensing procedure may be designed to be robust to different UE behaviors.

In another embodiment, autonomous UE resource allocation size selection mechanisms common across all UEs can be introduced. This option assumes that each UE follows a specified procedure of resource allocation size determination based on current traffic and radio environment situation.

In another embodiment when a UE receives a RLC SDU to the buffer it evaluates whether the RLC SDU fits to the transport block/media access control (TB/MAC) physical data unit (PDU) without segmentation. If yes, then the radio link control (RLC) service data unit (SDU) is passed to the MAC layer. If it fits with a substantial portion of padding used (e.g. 30% of a TB are filled by dummy bits), then the reselection may be triggered.

In another embodiment if it does not fit, then a UE can generate a transport block with a size that may accommodate the whole SDU without segmentation. In the same time, the frequency allocation size can be selected taking into account the target coverage and current congestion level. The target coverage may be regulated by the resulting energy per information bit for a pair of resource size and transport block size/modulation and coding scheme (TBS/MCS) values. The coverage levels and corresponding transmission parameters may be (pre)configured through radio resource control (RRC) signaling. The congestion levels are described further in a dedicated section.

In another embodiment a predefined mapping between packet size, congestion level and transmission parameters can be specified. In this case, an indicator of congestion level ranging from 0 to a maximum congestion indication value e.g. 7, may be derived from eNB signaling or calculated autonomously by a UE. The congestion indicator has a corresponding set of transmission parameters configured or fixed in a specification. While an example of 8 different congestion levels is provided, this is not intended to be limiting. The number of congestion levels may be 4, 16, 64, or another desired gradation.

In another embodiment the congestion level 0 may correspond to a less congested environment, thus a set of transmission parameters may comprise of wider frequency allocations with lower code rate, QPSK modulation and several retransmissions that would maximize coverage. The maximum congestion level, e.g. 7, may correspond to a frequency allocation with a code rate of >0.5, quadrature amplitude modulation (QAM)16 modulation and a single transmission time interval (TTI) transmission.

In one embodiment, a UE may change transmission parameters in an open loop manner. In this case, the UE may analyze the congestion level and decide to change the transmission rate and a resource size gradually. After changing the transmission parameters, the UE can analyze the congestion metrics again to evaluate whether this adjustment was appropriate or not.

In one embodiment, an eNB configuration can be relied on for a restricted set of transmission parameters. An eNB/network can regulate the allowed transmission parameters in order to provide similar performance in a given area regardless of a UE implementation.

In one embodiment, an eNB may configure a restricted range of allowed frequency resource sizes, transmission power, transmission rate in terms of transmission periodicity and semi-persistent resource allocation window range, multiplexing mode of control and data. This configuration may be based on an analysis of UE reports that are gathered by eNBs. In this example, UEs can be allowed to select any resource configuration within the restricted range. In this case, the congestion level may not be signaled to UEs explicitly. In addition, in some embodiments, the system may work the most optimal if the resource allocation size and transmission rate is adapted to a congestion level with possible assistance from the eNB.

Congestion Level Determination

In the case of autonomous resource size and transmission rate determination, a UE may need to be able to detect the congestion level on its own based on the radio measurements and traffic conditions. In the previous section, congestion level indexes (e.g. 4 or 8 different congestion levels) were introduced, which either may be derived from the eNB signaling or determined autonomously by the UE. The resource utilization metric that may be estimated by a UE as a fraction of resources with energy/power above a configured or predefined threshold(s) was also mentioned.

Besides the resource utilization (RU) metric, other metrics may be considered for autonomous congestion level determination. These metrics may be generally termed as Congestion Level Indication (CLI).

In one embodiment, the simplest way to calculate the CLI value is to estimate the average number of active V2V UEs in the UE proximity area. The equation to calculate the CLI value can be as follows: $CLI = N_{UE}$, where $N_{UE}$ is the total number of detected V2V UEs in the proximity area.

In another embodiment, to calculate the CLI value, the UE can estimate a relative amount of subframes allocated for transmission by other V2V UEs. The equation to calculate the CLI value can be as follows: $CLI = N_{SBF\_UE}/N_{SBF}$ where $N_{SBF}$ is the total amount of subframes available for transmission of a single data packet (with an associated physical sidelink shared channel PSSCH), and $N_{SBF\_UE}$ is the number of subframes allocated for transmission by other V2V UEs in the proximity area.

In another embodiment, to calculate the CLI value, the UE can estimate the average number of V2V UEs and the average number of resources used by this number of V2V users for data packet transmission. The equation to calculate the CLI value can be as follows: $CLI = N_{RES\_UE}/N_{RES}$ where $N_{RES}$ is the total amount of resources (time and frequency) available for transmission of a single Data packet (with the associated PSSCH), and $N_{RES\_UE}$ is the average amount of resources (time and frequency) needed for data transmission by V2V UEs in proximity area.

In another embodiment, the CLI value can be derived from a V2V environment energy measurement that can be interpreted as a level of interference in a proximity area. CLI can be described as an average interference level in a proximity area.

In one embodiment, the range of resource utilization values can correspond to a resource parameters set index. This option can be appropriate when there is only one threshold for a resource utilization calculation that is configured.

In another embodiment, a transmission parameters set index can be determined by evaluating whether the resource utilization falls in a selected range [0, 0.2, 0.4, 0.6, 0.8, 1, 1.2, 1.4, inf]. The transmission parameters set index '0' can then indicate that the resource utilization (RU) is between 0 and 0.2, index '1' can corresponds to an RU between 0.2 and 0.4 and so on. The resource utilization ranges for transmission parameters set index determination can either be fixed in a specification or can be configured by eNB signaling.

In another embodiment if multiple thresholds for RU calculation are configured, then a function of mapping those multiple values to a single RU value can be applied first, then this RU values can be evaluated to fall into a range similar to the embodiment where the CLI value is used to estimate the average number of active V2V UEs in the UE proximity area.

Different Sets of Transmission Parameters

The above discussed metrics provide a process to determine the set of transmission parameters for a UE that are allowed for selection during the reselection process. The set of parameters may be comprised of several different embodiments that will be described amongst others.

In one embodiment a number of physical resource blocks (PRBs), an MCS index, a number of retransmissions, and a multiplexing mode may be indicated per packet size or packet size range. In this case, almost all parameters for transmission are indicated in the set.

In another embodiment an energy per information bit may be indicated per packet size or packet size range. In this case, a UE may vary allocation size, MCS and multiplexing mode to fulfill the desired energy per information bit.

In another embodiment, a code rate or code rate range and the number retransmissions may be indicated per packet size or packet size range.

Dynamic Approach for V2V SA and Data Transmissions Multiplexing

As a special case, a UE may use the discussed metrics to switch between different control and data multiplexing modes: Time Domain Multiplexing (TDM) and Frequency Domain same-subframe multiplexing (FDM SSF) of control (SCI or scheduling assignments (SA) or PSCCH) and data communicated on a physical sidelink shared channel (PSSCH) from a transmitter perspective. For example, if a UE detects that, the congestion is low then the UE can configure SA and data transmission multiplexing in TDM mode in order to sense other V2V users from large distances using better coverage of standalone SA transmissions. If the UE detects that the congestion environment is medium/high, then it may configure SA and data transmission multiplexing in an FDM manner in order to be able to sense more nearby nodes, using lower power for SA transmissions and implicit SA resource scheduling.

FIG. 1 depicts functionality of a vehicle to vehicle communication system comprising of zones with different SA/Data transmission multiplexing.

As a special case, a UE may use the discussed metrics to switch between different control and data multiplexing modes: Time Domain Multiplexing (TDM) and Frequency Domain same-subframe multiplexing (FDM SSF) of control (SCI or SA or PSCCH) and data (PSSCH) from a transmitter perspective. For example, if a UE detects that, the congestion is low then the UE can configure SA and data transmission multiplexing in a TDM mode in order to sense other V2V users from large distances using better coverage of standalone SA transmissions. When the UE detects that a congestion environment is medium/high, then it may configure SA and data transmission multiplexing in an FDM manner in order to be able to sense more nearby nodes, using a lower power for SA transmissions and implicit SA resource scheduling.

For example, assume a V2V UE moves on a highway with a high speed. The average distance between cars is roughly several seconds of movement, thus, the average number of V2V users in a proximity would be relatively low and the congestion level would be low, resulting in underutilized spectrum resources. It is reasonable for the UE to use more transmissions thus increasing the coverage of both SA and data. In another example, the UE may approach an area of vehicles with relatively low speeds (e.g. a traffic-jam). The average number of V2V users will rapidly increase, resulting in a relatively high congestion level. Thus, the competition for resources may become tougher and the congestion level may become higher. In such conditions, it can be better to switch to the FDM mode in order to reduce resource usage. If the UE moves away from this traffic jam to the area with low congestion level, then it may again switch to the TDM mode. FIG. 1 represents the example described above.

Figure 2:
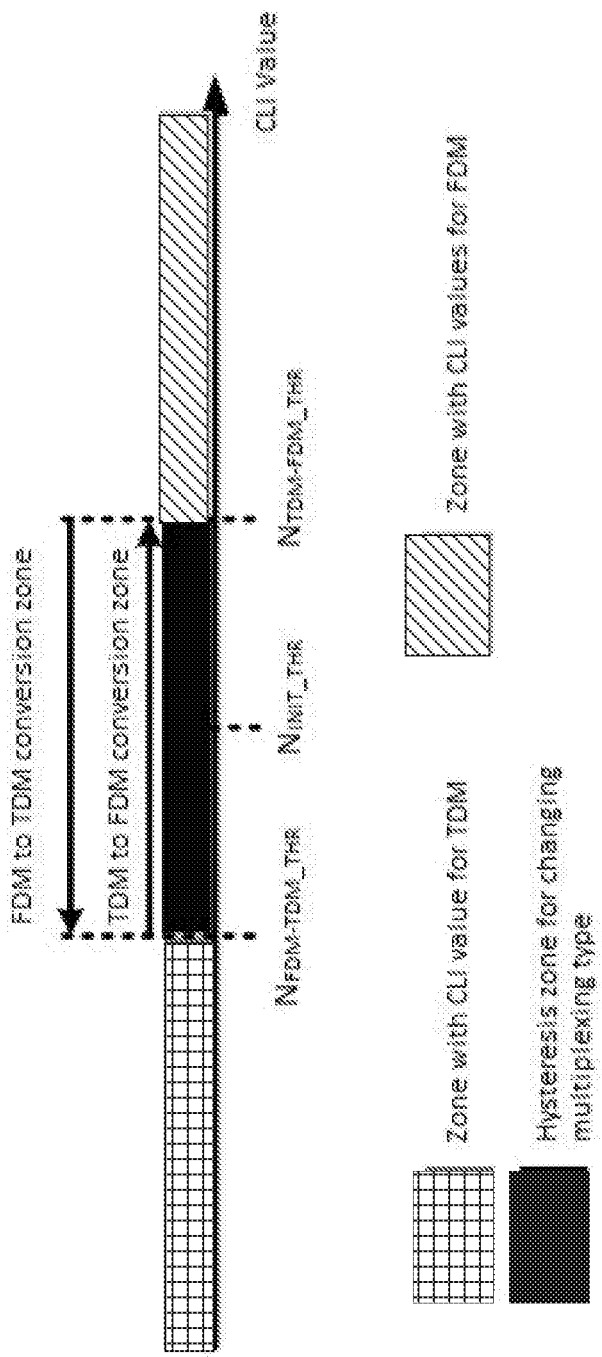
FIG. 2 depicts functionality of a vehicle to vehicle communication system's decision making for multiplexing selection, in accordance with an example.

FIG. 2 depicts functionality of a vehicle to vehicle communication system's decision making process for multiplexing selection. In addition FIG. 2 displays a threshold approach with an example rule for multiplexing selection based on the CLI.

In one embodiment, each time when a V2V UE utilizes a sensing procedure, the V2V UE can calculate the congestion level indication according to which the V2V UE can choose the multiplexing option for SA and data transmissions (see FIG. 2).

In another embodiment, in order to avoid ping-pong effect, the two thresholds may be configured to introduce a hysteresis behavior. In other words, when moving from low CLI values, the TDM-FDM threshold value ($N_{TDM\text{-}FDM\_THR}$) (as shown on the FIG. 2) can be used for switching to FDM and when moving from high CLI values, the $N_{FDM\text{-}TDM\_THR}$ threshold can be evaluated for switching to TDM. The conversion zone can be used to keep the V2V UEs from ping ponging between TDM and FDM.

Figure 3:
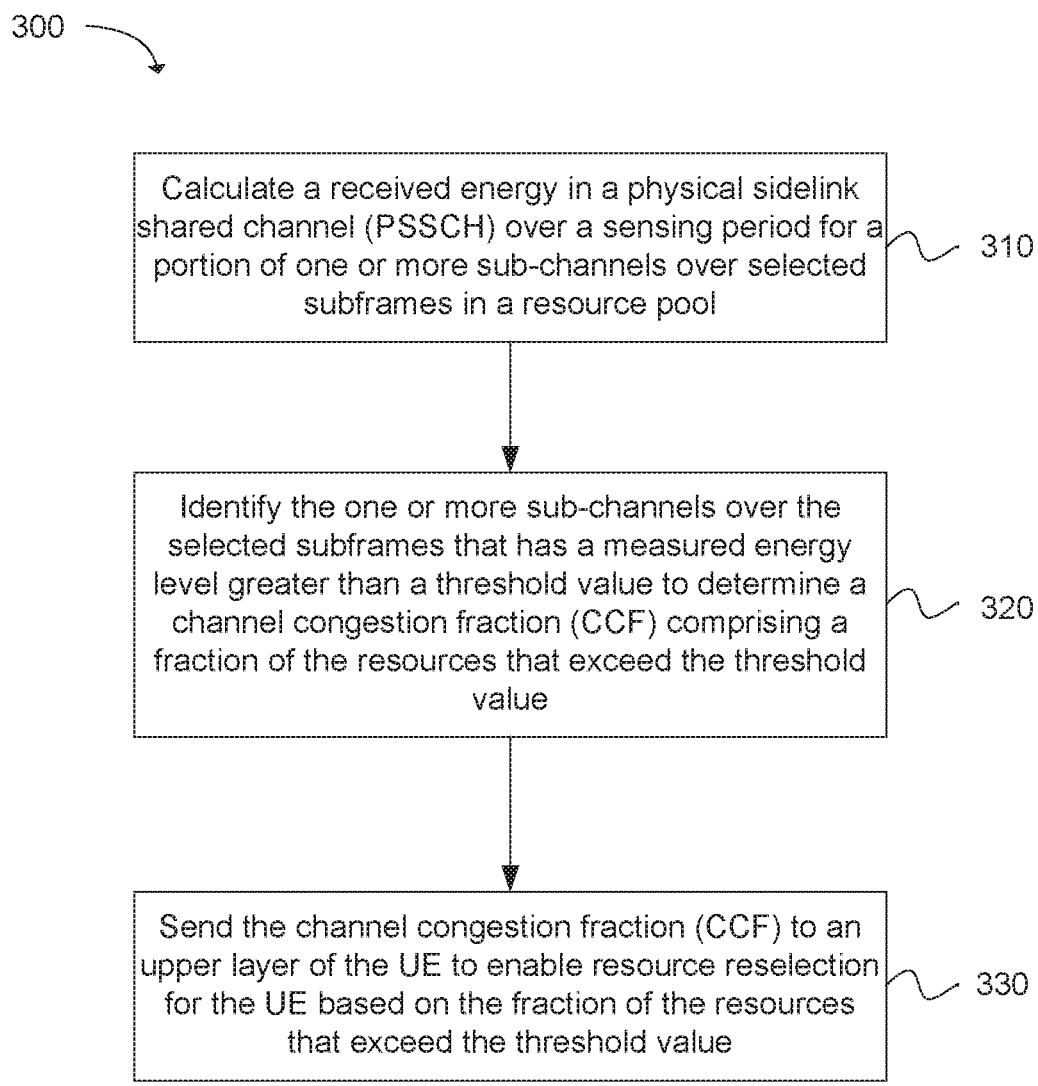
FIG. 3 depicts functionality of an apparatus of a user equipment (UE) configured to select spectrum resources in a vehicle to vehicle (V2V) communication system, in accordance with an example.

FIG. 3 depicts functionality 300 of an apparatus of a user equipment (UE) configured to select spectrum resources in a vehicle to vehicle (V2V) communication system. The apparatus can comprise one or more processors configured to calculate a received energy in a physical sidelink shared channel (PSSCH) over a sensing period for a portion of one or more sub-channels over selected subframes in a resource pool 310. The apparatus can comprise one or more processors configured to identify the one or more sub-channels over the selected subframes that has a measured energy level greater than a threshold value to determine a channel congestion fraction (CCF) comprising a fraction of the resources that exceed the threshold value 320. The apparatus can comprise one or more processors configured to send the channel congestion fraction (CCF) to an upper layer of the UE to enable resource reselection for the UE based on the fraction of the resources that exceed the threshold value 330.

In one embodiment the one or more processors are further configured to select the resources based on the determined CCF relative to a plurality of CCF ranges that are predetermined.

In one embodiment the received energy is a received signal strength indicator (RSSI) that is measured at the UE.

In one embodiment, the one or more processors are further configured to determine a number of retransmissions based on the determined CCF relative to a plurality of CCF ranges. For example, for each range, a selected number of retransmissions may be predetermined.

In one embodiment, the one or more processors are further configured to decode the energy level threshold value received from an evolved Node B (eNB) to determine the CCF. For example, an eNB may transmit the threshold value, or plurality of ranges of threshold values. The UE can receive the transmission and decode the energy level threshold value.

In one embodiment, the one or more processors are further configured to select a modulation and coding scheme based on the determined CCF relative to a plurality of CCF ranges.

In one embodiment, the one or more processors are further configured to decode a set of transmit parameters, received from an evolved Node B (eNB), for each CCF range. The set of transmit parameters can include: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power. Additional parameters may also be included in the set.

Figure 4:
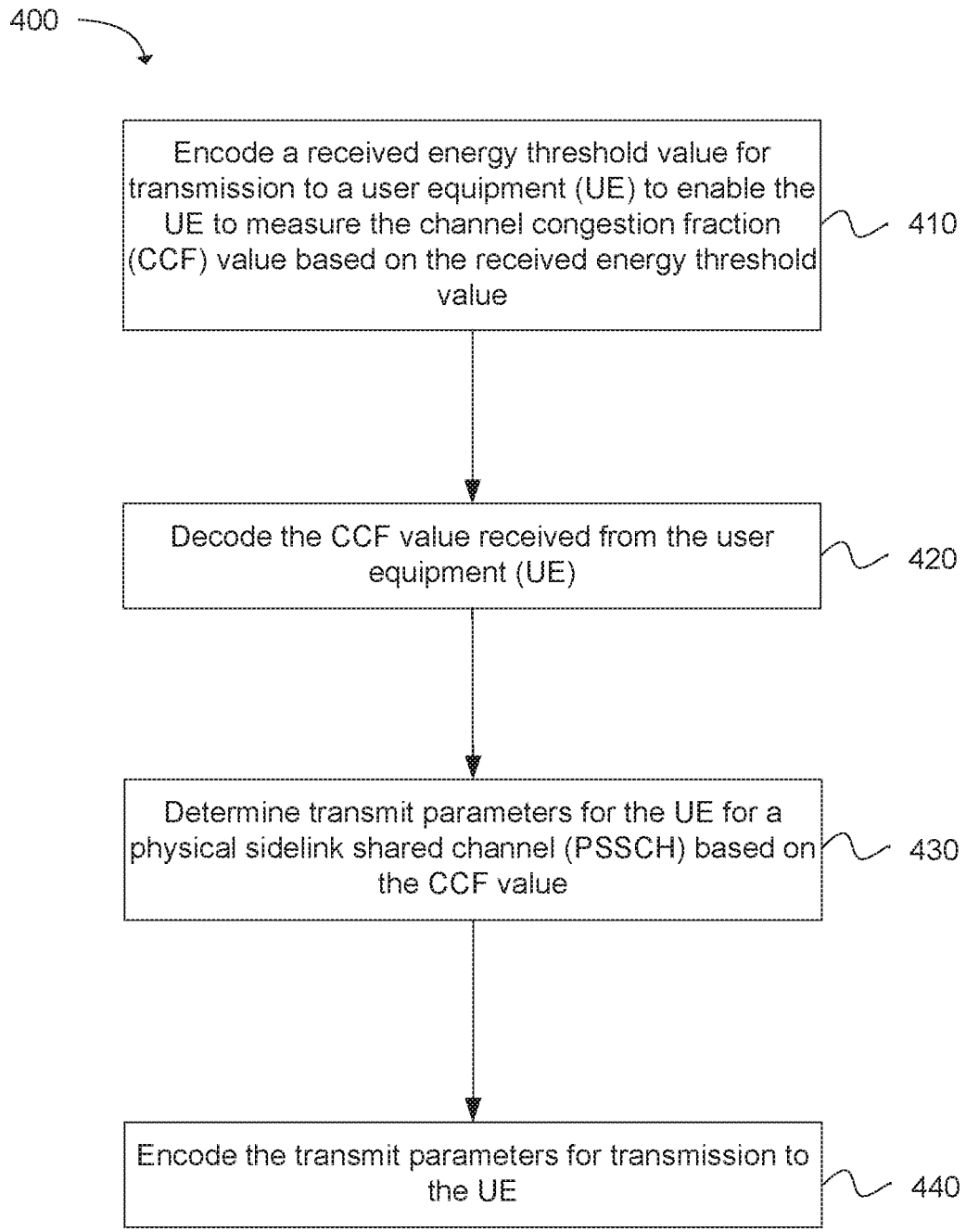
FIG. 4 depicts functionality of an apparatus of an evolved node B (eNB) configured to select spectrum resources in a vehicle to vehicle (V2V) communication system, in accordance with an example.

FIG. 4 depicts functionality 400 of an apparatus of an evolved node B (eNB) configured to select spectrum resources in a vehicle to vehicle (V2V) communication system. The apparatus can comprise one or more processors configured to encode a received energy threshold value for transmission to a user equipment (UE) to enable the UE to measure the channel congestion fraction (CCF) value based on the received energy threshold value 410. The apparatus can comprise one or more processors configured to decode the CCF value received from the user equipment (UE) 420. The apparatus can comprise one or more processors configured to determine transmit parameters for the UE for a physical sidelink shared channel (PSSCH) based on the CCF value 430. The apparatus can comprise one or more processors configured to encode the transmit parameters for transmission to the UE 440.

In one embodiment, the one or more processors are further configured to select the resources based on the measured CCF relative to a plurality of CCF ranges that are predetermined.

In one embodiment, the received energy threshold value is selected based on energy level measurements performed at the UE for a received signal strength indicator (RSSI) value transmitted from a base station, such as an eNB or gNB.

In one embodiment, the one or more processors are further configured to decode the CCF received from one or more UEs to provide a selected frequency allocation to the one or more UEs based on a level of congestion.

In one embodiment, the one or more processors are further configured to encode the energy level threshold value and send the energy level threshold value to one or more UEs in the network to enable the one or more UEs to determine the CCF.

In one embodiment, the one or more processors are further configured to encode a set of transmit parameters, for each CCF range. The set of transmit parameters can include a minimum modulation and coding scheme (MCS) value; a maximum MCS value; a minimum resource block number in the PSSCH; a maximum resource block number in the PSSCH; an allowed number of retransmissions in the PSSCH; and a maximum transmit power. The set of transmission parameters can be communicated to one or more UEs by broadcasting or unicasting the information. For example, RRC communications may be used to send each V2V UE a set of transmit parameters.

Figure 5:
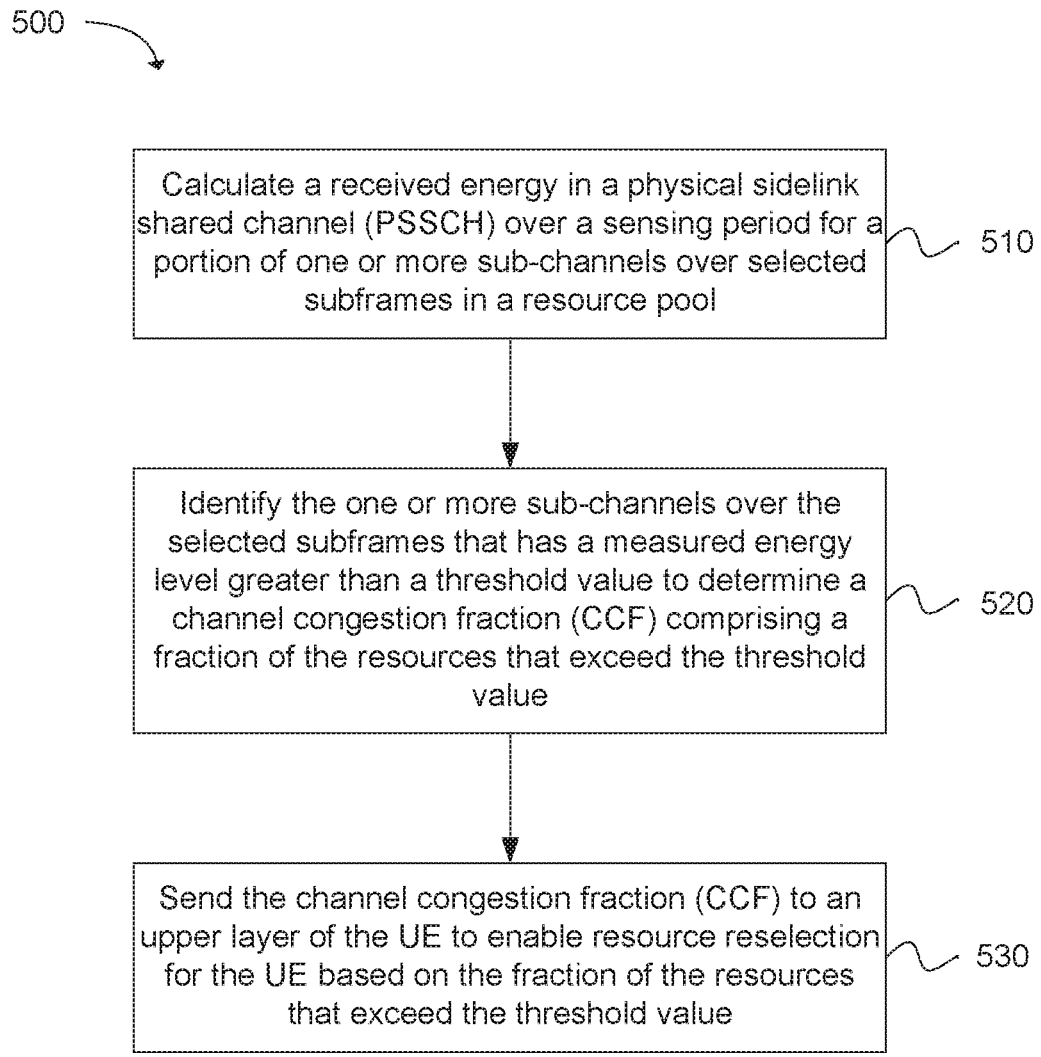
FIG. 5 depicts a flowchart of a machine readable storage medium having instructions embodied thereon for a user equipment (UE) configured to select spectrum resources in a vehicle to vehicle (V2V) communication system, in accordance with an example.

FIG. 5 depicts a flowchart 500 of a machine readable storage medium having instructions embodied thereon for a user equipment (UE) configured to select spectrum resources in a vehicle to vehicle (V2V) communication system. The instructions can be executed on a machine, where the instructions are included on at least one computer readable medium or one non-transitory machine readable storage medium. The instructions, when executed, perform calculating a received energy in a physical sidelink shared channel (PSSCH) over a sensing period for a portion of one or more sub-channels over selected subframes in a resource pool 510. The instructions, when executed, perform identifying the one or more sub-channels over the selected subframes that has a measured energy level greater than a threshold value to determine a channel congestion fraction (CCF) comprising a fraction of the resources that exceed the threshold value 520. The instructions, when executed, perform sending the channel congestion fraction (CCF) to an upper layer of the UE to enable resource reselection for the UE based on the fraction of the resources that exceed the threshold value 530.

In one embodiment, the at least one machine readable storage medium can further comprise instructions, that when executed by one or more processors at the UE can select the resources based on the determined CCF relative to a plurality of CCF ranges that are predetermined.

In one embodiment, the at least one machine readable storage medium wherein the received energy is a received signal strength indicator (RSSI) signal.

In one embodiment, the at least one machine readable storage medium can further comprise instructions, that when executed by one or more processors at the UE can determine a number of retransmissions based on the determined CCF relative to a plurality of CCF ranges.

In one embodiment, the at least one machine readable storage medium can further comprise instructions, that when executed by one or more processors at the UE can decode the energy level threshold value received from an evolved Node B (eNB) to determine the CCF.

In one embodiment, the at least one machine readable storage medium can further comprise instructions, that when executed by one or more processors at the UE can select a modulation and coding scheme (MCS) based on the determined CCF relative to a plurality of CCF ranges.

In one embodiment, the at least one machine readable storage medium can further comprise instructions, that when executed by one or more processors at the UE can decode a set of transmit parameters, received from an evolved Node B (eNB), for each CCF range. The set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Figure 6:
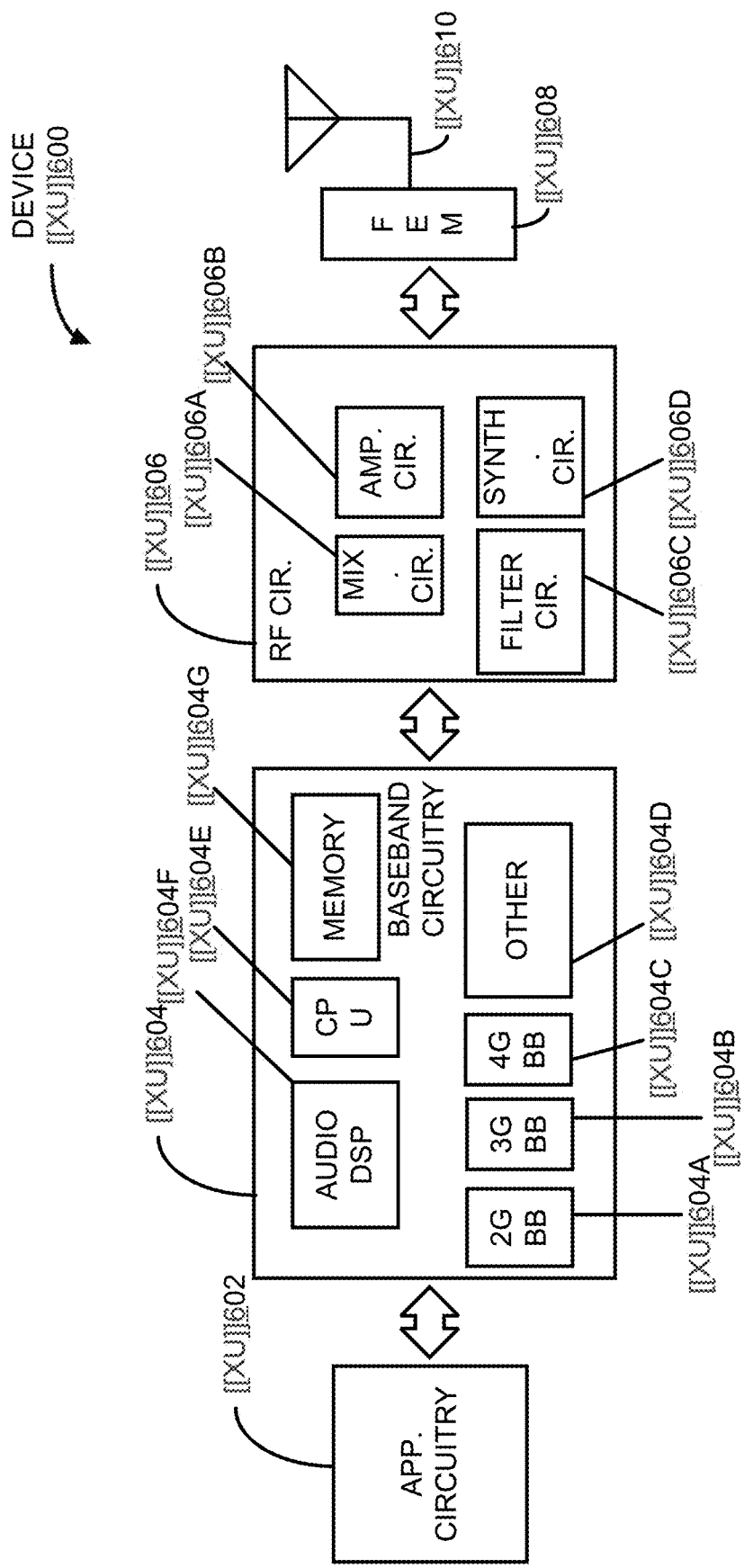
FIG. 6 illustrates example components of a device in accordance with some embodiments and an example.

FIG. 6 illustrates example components of a device in accordance with some embodiments. In some embodiments, the device 600 may include application circuitry 602, baseband circuitry 604, Radio Frequency (RF) circuitry 606, front-end module (FEM) circuitry 608, and one or more antennas 610, coupled together at least as shown. The components of the illustrated device 600 may be included a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, and/or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G etc.). The baseband circuitry 604 (e.g., one or more of baseband processors 604a-d) may handle various radio control functions that enable communication with one or more radio networks via the RF circuitry 606. In other embodiments, some or all of the functionality of baseband processors 604a-d may be included in modules stored in the memory 604g and executed via a Central Processing Unit (CPU) 604e. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a necessity. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606*d* may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some embodiments, the synthesizer circuitry 606*d* may be a fractional N/N+1 synthesizer.

In some embodiments, frequency input may be provided by a voltage controlled oscillator (VCO), although that is not a necessity. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606*d* of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the device 600 comprises a plurality of power saving mechanisms. If the device 600 is in an RRC_Connected state, where it is still connected to the RAN node as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device cannot receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, and/or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
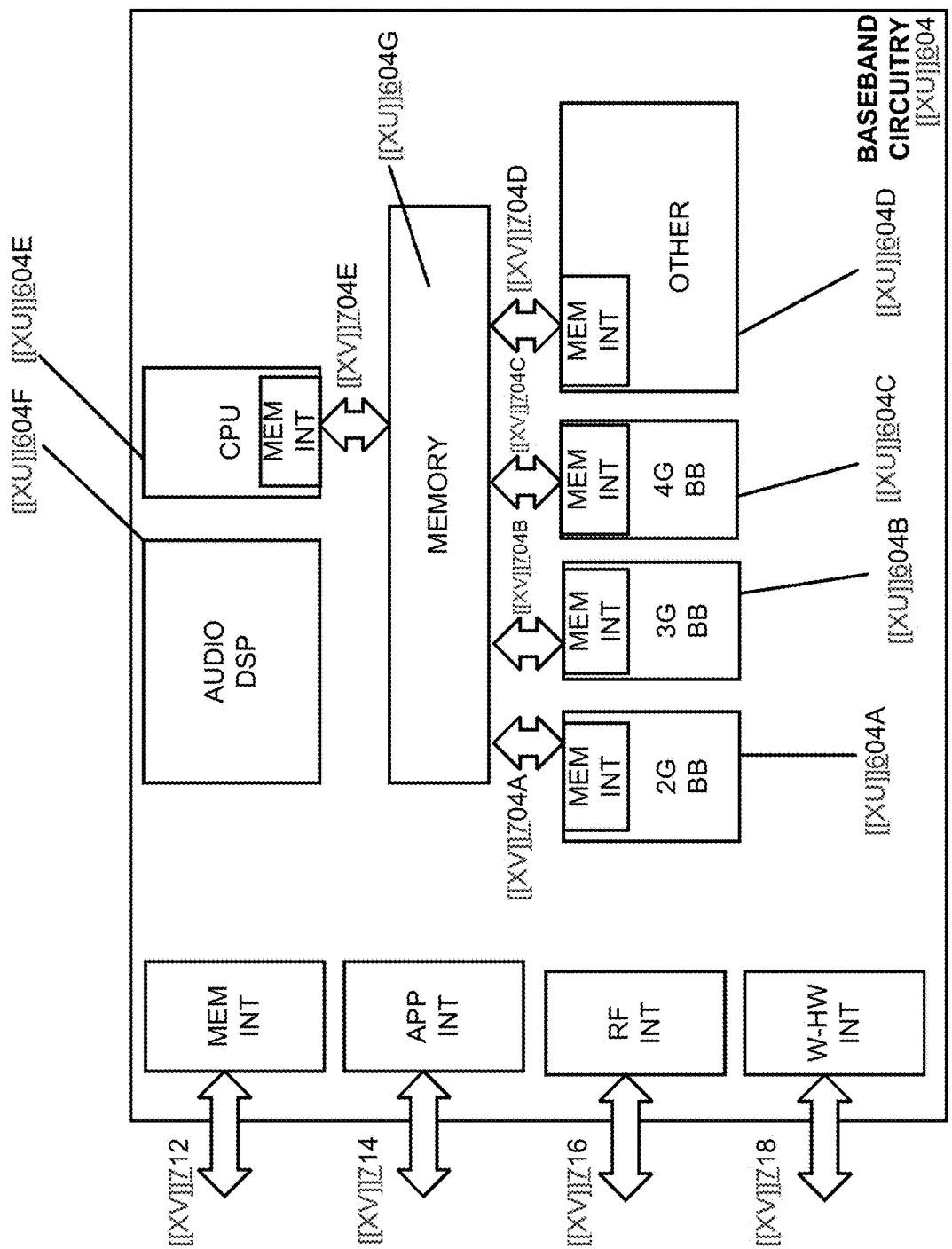
FIG. 7 illustrates example interfaces of baseband circuitry in accordance with some embodiments and an example.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), and a wireless hardware connectivity interface 718 (e.g., an interface to send/receive data to/from Near Field Communication (NFC) components, Bluetooth® components (e.g., Bluetooth® Low Energy), Wi-Fi® components, and other communication components).

Figure 8:
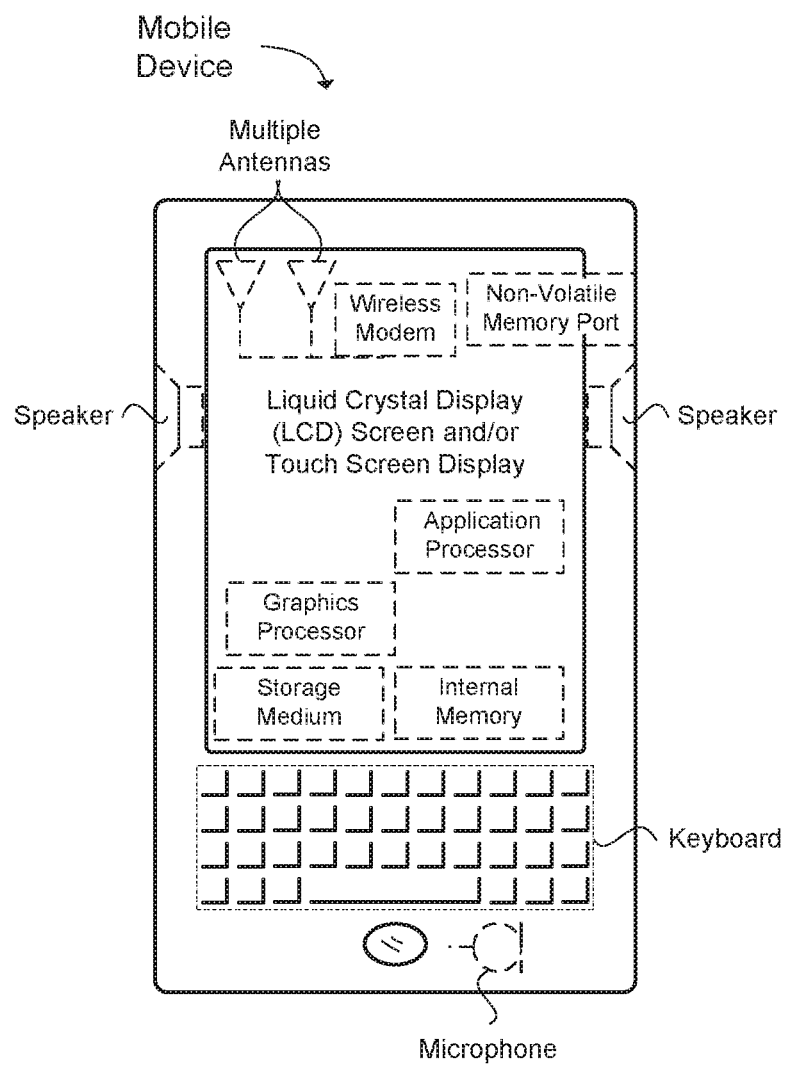
FIG. 8 illustrates a diagram of a wireless device (e.g., UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 9:
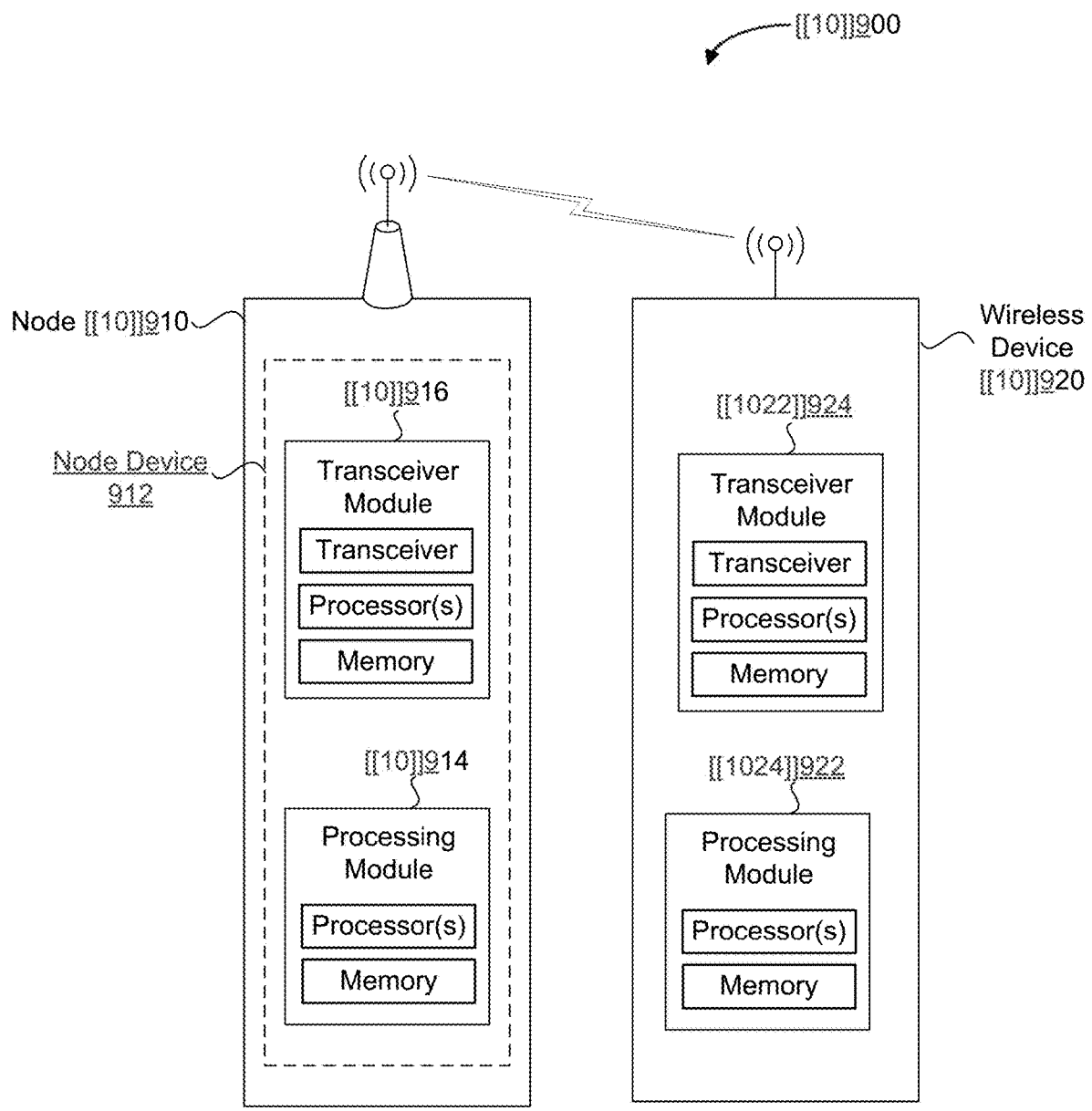
FIG. 9 illustrates a diagram of a node (e.g., eNB and/or a Serving GPRS Support Node) and a wireless device (e.g., UE), in accordance with an example.

FIG. 9 illustrates a diagram 900 of a node 910 (e.g., eNB, gNB and/or a Serving GPRS Support Node) and a wireless device 920 (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 910 can include a node device 912. The node device 912 or the node 910 can be configured to communicate with the wireless device 920. The node device 912 can be configured to implement technologies described herein. The node device 912 can include a processing module 914 and a transceiver module 916. In one aspect, the node device 912 can include the transceiver module 916 and the processing module 914 forming a circuitry for the node 910. In one aspect, the transceiver module 916 and the processing module 914 can form a circuitry of the node device 912. The processing module 914 can include one or more processors and memory. In one embodiment, the processing module 922 can include one or more application processors. The transceiver module 916 can include a transceiver and one or more processors and memory. In some examples, components of the transceiver module 916 can be included in separate devices. For example, selected components of the transceiver module 916 may be located in a cloud radio access network (C-RAN). In one embodiment, the transceiver module 916 can include a baseband processor. In some examples, components of the transceiver module 916 can be included in separate devices.

The wireless device 920 can include a transceiver module 924 and a processing module 922. The processing module 922 can include one or more processors and memory. In one embodiment, the processing module 922 can include one or more application processors. The transceiver module 924 can include a transceiver and one or more processors and memory. In one embodiment, the transceiver module 924 can include a baseband processor. The wireless device 920 can be configured to implement technologies described herein. The node 910 and the wireless devices 920 can also include one or more storage mediums, such as the transceiver module 916, 924 and/or the processing module 914, 922.

Examples

The following examples pertain to specific technology embodiments and point out specific features, elements, or actions that can be used or otherwise combined in achieving such embodiments.

Example 1 includes an apparatus of a user equipment (UE) configured to select spectrum resources in a vehicle to vehicle (V2V) communication system, the apparatus comprising: one or more processors configured to: calculate a received energy in a physical sidelink shared channel (PSSCH) over a sensing period for a portion of one or more sub-channels over selected subframes in a resource pool; identify the one or more sub-channels over the selected subframes that has a measured energy level greater than a threshold value to determine a channel congestion fraction (CCF) comprising a fraction of the resources that exceed the threshold value; and send the channel congestion fraction (CCF) to an upper layer of the UE to enable resource reselection for the UE based on the fraction of the resources that exceed the threshold value; and a memory interface configured to send to a memory the CCF.

Example 2 includes the apparatus of example 1, wherein the one or more processors are further configured to select the resources based on the determined CCF relative to a plurality of CCF ranges that are predetermined.

Example 3 includes the apparatus of the UE of example 1 or 2, wherein the received energy is a received signal strength indicator (RSSI).

Example 4 includes the apparatus of the UE of example 1 or 2, wherein the one or more processors are further configured to determine a number of retransmissions based on the determined CCF relative to a plurality of CCF ranges.

Example 5 includes the apparatus of the UE of example 1 or 2, wherein the one or more processors are further configured to decode the energy level threshold value received from an evolved Node B (eNB) to determine the CCF.

Example 6 includes the apparatus of the UE of example 1, wherein the one or more processors are further configured to select a modulation and coding scheme based on the determined CCF relative to a plurality of CCF ranges.

Example 7 includes the apparatus of the UE of example 1, wherein the one or more processors are further configured to decode a set of transmit parameters, received from an evolved Node B (eNB), for each CCF range, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 8 includes an apparatus of an evolved node B (eNB) configured to select spectrum resources in a vehicle to vehicle (V2V) communication system, the apparatus comprising: one or more processors configured to: encode a received energy threshold value for transmission to a user equipment (UE) to enable the UE to measure a channel congestion fraction (CCF) value based on the received energy threshold value; decode the CCF value received from the user equipment (UE); determine transmit parameters for the UE for a physical sidelink shared channel (PSSCH) based on the CCF value; and encode the transmit parameters for transmission to the UE; and a memory interface configured to send to a memory the CCF.

Example 9 includes the apparatus of the eNB of example 8, wherein the one or more processors are further configured to select the resources based on the determined CCF relative to a plurality of CCF ranges that are predetermined.

Example 10 includes the apparatus of the UE of example 8 or 9, wherein the received energy threshold value is a received signal strength indicator (RSSI) value.

Example 11 includes the apparatus of the eNB of example 8, wherein the one or more processors is further configured to decode the CCF received from one or more UEs to provide a selected frequency allocation to the one or more UEs based on a level of congestion.

Example 12 includes the apparatus of the eNB of example 8 or 9, wherein the one or more processors are further configured to encode the energy level threshold value and send the energy level threshold value to one or more UEs in the network to enable the one or more UEs to determine the CCF.

Example 13 includes the apparatus of the eNB of example 8, wherein the one or more processors are further configured to encode a set of transmit parameters, for one or more selected CCF ranges in the plurality of CCF ranges, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 14 includes at least one machine readable storage medium having instructions embodied thereon for a user equipment (UE) configured to select spectrum resources in a vehicle to vehicle (V2V) communication system, the instructions when executed by one or more processors at the UE perform the following: calculate a received energy in a physical sidelink shared channel (PSSCH) over a sensing period for a portion of one or more sub-channels over selected subframes in a resource pool; identify the one or more sub-channels over the selected subframes that has a measured energy level greater than a threshold value to determine a channel congestion fraction (CCF) comprising a fraction of the resources that exceed the threshold value; and send the channel congestion fraction (CCF) to an upper layer of the UE to enable resource reselection for the UE based on the fraction of the resources that exceed the threshold value.

Example 15 includes the at least one machine readable storage medium in example 14 further comprising instructions, that when executed by one or more processors at the UE, perform the following: select the resources based on the determined CCF relative to a plurality of CCF ranges that are predetermined.

Example 16 includes the at least one machine readable storage medium in example 14 or 15 wherein the received energy is a received signal strength indicator (RSSI) signal.

Example 17 includes the at least one machine readable storage medium in example 14 further comprising instructions, that when executed by one or more processors at the UE, perform the following: determine a number of retransmissions based on the determined CCF relative to a plurality of CCF ranges.

Example 18 includes the at least one machine readable storage medium in example 14 further comprising instructions, that when executed by one or more processors at the UE, perform the following: decode the energy level threshold value received from an evolved Node B (eNB) to determine the CCF.

Example 19 includes the at least one machine readable storage medium in example 14 or 15 further comprising instructions, that when executed by one or more processors at the UE, perform the following: select a modulation and coding scheme (MCS) based on the determined CCF relative to a plurality of CCF ranges.

Example 20 includes the at least one machine readable storage medium in example 14 further comprising instructions, that when executed by one or more processors at the UE, perform the following: decode a set of transmit parameters, received from an evolved Node B (eNB), for each CCF range, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 21 includes an apparatus of a user equipment (UE) configured to select spectrum resources in a vehicle to vehicle (V2V) communication system, the apparatus comprising: one or more processors configured to: calculate a received energy in a physical sidelink shared channel (PSSCH) over a sensing period for a portion of one or more sub-channels over selected subframes in a resource pool; identify the one or more sub-channels over the selected subframes that has a measured energy level greater than a threshold value to determine a channel congestion fraction (CCF) comprising a fraction of the resources that exceed the threshold value; and send the channel congestion fraction (CCF) to an upper layer of the UE to enable resource reselection for the UE based on the fraction of the resources that exceed the threshold value; and a memory interface configured to send to a memory the CCF.

Example 22 includes the apparatus of the UE of example 21, wherein the one or more processors are further configured to select the resources based on the determined CCF relative to a plurality of CCF ranges that are predetermined or determine a number of retransmissions based on the determined CCF relative to a plurality of CCF ranges.

Example 23 includes the apparatus of the UE of example 21 or 22, wherein the received energy is a received signal strength indicator (RSSI).

Example 24 includes the apparatus of the UE of example 21 or 22, wherein the one or more processors are further configured to decode the energy level threshold value received from an evolved Node B (eNB) to determine the CCF or select a modulation and coding scheme based on the determined CCF relative to a plurality of CCF ranges.

Example 25 includes the apparatus of the UE of example 21, wherein the one or more processors are further configured to decode a set of transmit parameters, received from an evolved Node B (eNB), for each CCF range, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 26 includes an apparatus of an evolved node B (eNB) configured to select spectrum resources in a vehicle to vehicle (V2V) communication system, the apparatus comprising: one or more processors configured to: encode a received energy threshold value for transmission to a user equipment (UE) to enable the UE to measure a channel congestion fraction (CCF) value based on the received energy threshold value; decode the CCF value received from the user equipment (UE); determine transmit parameters for the UE for a physical sidelink shared channel (PSSCH) based on the CCF value; and encode the transmit parameters for transmission to the UE; and a memory interface configured to send to a memory the CCF.

Example 27 includes the apparatus of the eNB of example 26, wherein the one or more processors are further configured to select the resources based on the determined CCF relative to a plurality of CCF ranges that are predetermined.

Example 28 includes the apparatus of the UE of example 26 or 27, wherein the received energy threshold value is a received signal strength indicator (RSSI) value.

Example 29 includes the apparatus of the eNB of example 26, wherein the one or more processors is further configured to decode the CCF received from one or more UEs to provide a selected frequency allocation to the one or more UEs based on a level of congestion or encode the energy level threshold value and send the energy level threshold value to one or more UEs in the network to enable the one or more UEs to determine the CCF.

Example 30 includes the apparatus of the eNB of example 26, wherein the one or more processors are further configured to encode a set of transmit parameters, for one or more selected CCF ranges in the plurality of CCF ranges, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 31 includes at least one machine readable storage medium having instructions embodied thereon for a user equipment (UE) configured to select spectrum resources in a vehicle to vehicle (V2V) communication system, the instructions when executed by one or more processors at the UE perform the following: calculate a received energy in a physical sidelink shared channel (PSSCH) over a sensing period for a portion of one or more sub-channels over selected subframes in a resource pool; identify the one or more sub-channels over the selected subframes that has a measured energy level greater than a threshold value to determine a channel congestion fraction (CCF) comprising a fraction of the resources that exceed the threshold value; and send the channel congestion fraction (CCF) to an upper layer of the UE to enable resource reselection for the UE based on the fraction of the resources that exceed the threshold value.

Example 32 includes the at least one machine readable storage medium in example 31 further comprising instructions, that when executed by one or more processors at the UE, perform the following: select the resources based on the determined CCF relative to a plurality of CCF ranges that are predetermined; or determine a number of retransmissions based on the determined CCF relative to a plurality of CCF ranges.

Example 33 includes the at least one machine readable storage medium in example 31 or 32 wherein the received energy is a received signal strength indicator (RSSI) signal.

Example 34 includes the at least one machine readable storage medium in example 31 further comprising instructions, that when executed by one or more processors at the UE, perform the following: decode the energy level threshold value received from an evolved Node B (eNB) to determine the CCF; or select a modulation and coding scheme (MCS) based on the determined CCF relative to a plurality of CCF ranges.

Example 35 includes the at least one machine readable storage medium in example 31 further comprising instructions, that when executed by one or more processors at the UE, perform the following: decode a set of transmit parameters, received from an evolved Node B (eNB), for each CCF range, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Example 36 includes a user equipment (UE) operable to select spectrum resources in a vehicle to vehicle (V2V) communication system, the UE comprising: means for calculating a received energy in a physical sidelink shared channel (PSSCH) over a sensing period for a portion of one or more sub-channels over selected subframes in a resource pool; means for identifying the one or more sub-channels over the selected subframes that has a measured energy level greater than a threshold value to determine a channel congestion fraction (CCF) comprising a fraction of the resources that exceed the threshold value; and means for sending the channel congestion fraction (CCF) to an upper layer of the UE to enable resource reselection for the UE based on the fraction of the resources that exceed the threshold value.

Example 37 includes the UE of example 36 further comprising: means for selecting the resources based on the determined CCF relative to a plurality of CCF ranges that are predetermined.

Example 38 includes the UE of example 36 or 37 wherein the received energy is a received signal strength indicator (RSSI) signal.

Example 39 includes the UE of example 36 further comprising: means for determining a number of retransmissions based on the determined CCF relative to a plurality of CCF ranges.

Example 40 includes the UE of example 36 further comprising: means for decoding the energy level threshold value received from an evolved Node B (eNB) to determine the CCF.

Example 41 includes the UE of example 36 or 37 further comprising: means for selecting a modulation and coding scheme (MCS) based on the determined CCF relative to a plurality of CCF ranges.

Example 42 includes the UE of example 36 further comprising: means for decoding a set of transmit parameters, received from an evolved Node B (eNB), for each CCF range, wherein the set of transmit parameters includes: a minimum modulation and coding scheme (MCS) value; a maximum MCS value; a minimum resource block number in the PSSCH; a maximum resource block number in the PSSCH; an allowed number of retransmissions in the PSSCH; and a maximum transmit power.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) configured to select spectrum resources in a vehicle to vehicle (V2V) communication system, the apparatus comprising:
one or more processors configured to:
calculate a received energy in a physical sidelink shared channel (PSSCH) over a sensing period for a portion of one or more sub-channels over selected subframes in a resource pool;
identify the one or more sub-channels over the selected subframes that has a measured energy level greater than a threshold value to determine a channel congestion fraction (CCF) comprising a fraction of the resources that exceed the threshold value;
send the channel congestion fraction (CCF) to an upper layer of the UE to enable resource reselection for the UE based on the fraction of the resources that exceed the threshold value;
identify, within a plurality of predetermined CCF ranges, a CCF range that includes the determined CCF; and
select the resources based on a first transmit parameter associated with the identified CCF range; and
a memory interface configured to send to a memory the CCF.

2. The apparatus of the UE of claim 1, wherein the received energy is a received signal strength indicator (RSSI).

3. The apparatus of the UE of claim 1, wherein the one or more processors are further configured to determine a number of retransmissions based on a second transmit parameter associated with the CCF range.

4. The apparatus of the UE of claim 1, wherein the one or more processors are further configured to decode the energy level threshold value received from an evolved Node B (eNB) to determine the CCF.

5. The apparatus of the UE of claim 1, wherein the one or more processors are further configured to select a modulation and coding scheme based on a second transmit parameter associated with the CCF range.

6. The apparatus of the UE of claim 1, wherein the one or more processors are further configured to decode a set of transmit parameters, received from an evolved Node B (eNB), for each of the plurality of CCF ranges, wherein the set of transmit parameters includes:
a minimum modulation and coding scheme (MCS) value;
a maximum MCS value;
a minimum resource block number in the PSSCH;
a maximum resource block number in the PSSCH;
an allowed number of retransmissions in the PSSCH; and
a maximum transmit power.

7. An apparatus of an evolved node B (eNB) configured to select spectrum resources in a vehicle to vehicle (V2V) communication system, the apparatus comprising:
one or more processors configured to:
encode a received energy threshold value for transmission to a user equipment (UE) to enable the UE to measure a channel congestion fraction (CCF) value based on the received energy threshold value;
decode the CCF value received from the user equipment (UE);
determine transmit parameters for the UE for a physical sidelink shared channel (PSSCH) based on the CCF value;
encode the transmit parameters for transmission to the UE;
identify, within a plurality of predetermined CCF ranges, a CCF range that includes the decoded CCF; and
select the resources based on a first transmit parameter associated with the identified CCF range; and
a memory interface configured to send to a memory the CCF.

8. The apparatus of the eNB of claim 7, wherein the received energy threshold value is a received signal strength indicator (RSSI) value.

9. The apparatus of the eNB of claim 7, wherein the one or more processors is further configured to decode the CCF received from one or more UEs to provide a selected frequency allocation to the one or more UEs based on a level of congestion.

10. The apparatus of the eNB of claim 7, wherein the one or more processors are further configured to encode the energy level threshold value and send the energy level threshold value to one or more UEs in the network to enable the one or more UEs to determine the CCF.

11. The apparatus of the eNB of claim 7, wherein the one or more processors are further configured to encode a set of transmit parameters, for one or more selected CCF ranges in the plurality of predetermined CCF ranges, wherein the set of transmit parameters includes:
a minimum modulation and coding scheme (MCS) value;
a maximum MCS value;
a minimum resource block number in the PSSCH;
a maximum resource block number in the PSSCH;
an allowed number of retransmissions in the PSSCH; and
a maximum transmit power.

12. At least one non-transitory machine readable storage medium having instructions embodied thereon for a user equipment (UE) configured to select spectrum resources in a vehicle to vehicle (V2V) communication system, the instructions when executed by one or more processors at the UE perform the following:
calculate a received energy in a physical sidelink shared channel (PSSCH) over a sensing period for a portion of one or more sub-channels over selected subframes in a resource pool;
identify the one or more sub-channels over the selected subframes that has a measured energy level greater than a threshold value to determine a channel congestion fraction (CCF) comprising a fraction of the resources that exceed the threshold value;
send the channel congestion fraction (CCF) to an upper layer of the UE to enable resource reselection for the UE based on the fraction of the resources that exceed the threshold value;
identify, within a plurality of predetermined CCF ranges, a CCF range that includes the determined CCF; and
select the resources based on a first transmit parameter associated with the identified CCF range.

13. The at least one non-transitory machine readable storage medium in claim 12 wherein the received energy is a received signal strength indicator (RSSI) signal.

14. The at least one non-transitory machine readable storage medium in claim 12 further comprising instructions, that when executed by one or more processors at the UE, perform the following:
determine a number of retransmissions based on a second transmit parameter associated with the CCF range.

15. The at least one non-transitory machine readable storage medium in claim 12 further comprising instructions, that when executed by one or more processors at the UE, perform the following:

decode the energy level threshold value received from an evolved Node B (eNB) to determine the CCF.

16. The at least one non-transitory machine readable storage medium in claim 12 further comprising instructions, that when executed by one or more processors at the UE, perform the following:
    select a modulation and coding scheme (MCS) based on a second transmit parameter associated with the CCF range.

17. The at least one non-transitory machine readable storage medium in claim 12 further comprising instructions, that when executed by one or more processors at the UE, perform the following:
    decode a set of transmit parameters, received from an evolved Node B (eNB), for each of the plurality of predetermined CCF ranges, wherein the set of transmit parameters includes:
    a minimum modulation and coding scheme (MCS) value;
    a maximum MCS value;
    a minimum resource block number in the PSSCH;
    a maximum resource block number in the PSSCH;
    an allowed number of retransmissions in the PSSCH; and
    a maximum transmit power.

\* \* \* \* \*